United States Patent
Westberg et al.

(10) Patent No.: US 12,434,384 B2
(45) Date of Patent: Oct. 7, 2025

(54) METHOD AND CONTROL SYSTEM FOR CONTROLLING MOVEMENT TRAJECTORIES OF A ROBOT

(71) Applicant: ABB Schweiz AG, Baden (CH)

(72) Inventors: Stefan Westberg, Västerås (SE); Giacomo Spampinato, Västerås (SE)

(73) Assignee: ABB Schweiz AG, Baden (CH)

(*) Notice: Subject to any disclaimer, the term of this patent is extended or adjusted under 35 U.S.C. 154(b) by 1316 days.

(21) Appl. No.: 17/049,019

(22) PCT Filed: Apr. 25, 2018

(86) PCT No.: PCT/EP2018/060526
§ 371 (c)(1),
(2) Date: Oct. 19, 2020

(87) PCT Pub. No.: WO2019/206408
PCT Pub. Date: Oct. 31, 2019

(65) Prior Publication Data
US 2021/0245364 A1 Aug. 12, 2021

(51) Int. Cl.
*B25J 9/16* (2006.01)
*B25J 9/00* (2006.01)

(52) U.S. Cl.
CPC .......... *B25J 9/1664* (2013.01); *B25J 9/0081* (2013.01); *B25J 9/1671* (2013.01);
(Continued)

(58) Field of Classification Search
CPC ...... B25J 9/1664; B25J 9/0081; B25J 9/1671; G05B 2219/40463; G05B 2219/40465; G05B 2219/40515
See application file for complete search history.

(56) References Cited

U.S. PATENT DOCUMENTS 6,216,058 B1    4/2001  Hosek et al.
7,853,356 B2 * 12/2010  Tsai .................. B25J 9/1671
                                                                318/568.22
(Continued)

FOREIGN PATENT DOCUMENTS

CN    102441719 A  *  5/2012
CN    102520721 A     6/2012
CN    104570735 A  *  4/2015

OTHER PUBLICATIONS

"Yang, J; Kim, J; Pitarch, E; Abdel-Malek, K; Optimal Trajectory Planning for Redundant Manipulators Based on Minimum Jerk; Aug. 2008; Proceedings of Design Engineering Technical Conference & Computers and Information 2008: Mechanisms and Robotics Conference" (Year: 2008).*

(Continued)

*Primary Examiner* — Ramya P Burgess
*Assistant Examiner* — Christopher R Cardimino
(74) *Attorney, Agent, or Firm* — Whitmyer IP Group LLC

(57) ABSTRACT

A method for controlling movement trajectories of a robot, the method including predicting, in an offline mode, values of at least one parameter related to the execution of alternative movement trajectories between a first position of the robot and a second position of the robot; selecting, in the offline mode, a movement trajectory based on the predicted values of the at least one parameter; and executing the selected movement trajectory by the robot. A control system for controlling movement trajectories of a robot is also provided.

14 Claims, 5 Drawing Sheets

(52) U.S. Cl.
CPC .............. *G05B 2219/40463* (2013.01); *G05B 2219/40465* (2013.01); *G05B 2219/40515* (2013.01)

(56) References Cited

U.S. PATENT DOCUMENTS

| | | | | |
|---|---|---|---|---|
| 9,573,273 | B2* | 2/2017 | Takeda | G06N 20/00 |
| 10,169,804 | B2* | 1/2019 | Thangaraj | G01C 21/34 |
| 10,406,687 | B2* | 9/2019 | Lalonde | B25J 9/1666 |
| 10,754,337 | B2* | 8/2020 | Keshmiri | G05D 1/02 |
| 2007/0005179 | A1 | 1/2007 | Mccrackin et al. | |
| 2007/0030271 | A1* | 2/2007 | Kamiya | B25J 9/1664 |
| | | | | 345/442 |
| 2008/0103694 | A1* | 5/2008 | Dix | A01B 69/008 |
| | | | | 701/425 |
| 2010/0154933 | A1* | 6/2010 | Hatch, Jr. | B27M 1/08 |
| | | | | 144/286.5 |
| 2011/0153080 | A1 | 6/2011 | Shapiro et al. | |
| 2014/0257558 | A1* | 9/2014 | Frische | B25J 9/1664 |
| | | | | 700/245 |
| 2015/0239121 | A1 | 8/2015 | Takeda | |
| 2016/0271799 | A1* | 9/2016 | Sugio | B25J 9/1664 |
| 2022/0402132 | A1* | 12/2022 | Kimura | B25J 9/1666 |

OTHER PUBLICATIONS

"Elbanhawi, Mohamed; Simic, Milan; Jazar, Reza; Continuous Path Smoothing for Car-Like Robots Using B-Spline Curves; 2015; J Intell Robot Syst (2015) 80 (Suppl 1):S23-S56" (Year: 2015).*
Chinese Office Action; Application No. 2018800924472; Completed: Feb. 22, 2023; 10 Pages.
European Office Action; Application No. 18721325.1; Completed: Dec. 7, 2022; 13 Pages.
International Preliminary Report of Patentability; Application No. PCT/EP2018/060526; Issued: Oct. 27, 2020; 9 Pages.
Shiller, Zvi; "Off-Line and On-Line Trajectory Planning" ; Motion and Operation Planning of Robotic Systems Background and Practical Approaches; Springer International Publishing Switzerland 2015; 35 Pages.
Written Opinion of the International Searching Authority: Application No. PCT /EP2018-060526; Completed: Mar. 6, 2019; Mailing Date: Mar. 15, 2019; 12 Pages.
Second Chinese Office Action; Application No. 2018800924472; Issued: Sep. 8, 2023; 17 Pages.

* cited by examiner

METHOD AND CONTROL SYSTEM FOR CONTROLLING MOVEMENT TRAJECTORIES OF A ROBOT

TECHNICAL FIELD

The present disclosure generally relates to the control of movement trajectories of a robot. In particular, the present disclosure provides a method and a control system for controlling movement trajectories of a robot where values of at least one parameter related to the execution of alternative movement trajectories are predicted.

BACKGROUND

When programming a robot, a user typically has to define the movement trajectory between positions using different instructions. In order to create time-optimal programs, the user must do an extensive search. Many times, users desire a time-optimal movement trajectory and care less about the exact path. In order to program a time-optimal movement trajectory, users often have to carry out many manual complicated tests. However, some users do not possess enough knowledge to carry out such tests. Moreover, such tests are time consuming. A time-optimal movement trajectory can also be found by spline search. However, spline searches are very computationally heavy. Today, users do not have access to any programming tool that can effectively and easily find a time-optimal movement trajectory.

U.S. Pat. No. 6,216,058 B1 discloses a system for providing generation of trajectories with easy-to-track or continuous acceleration profiles for simple and blended moves of single- and multi-arm robotic manipulators, such as an extension and retraction move along a straight line or a rotary move following a circular arc, with velocity, acceleration, jerk, and jerk rate constraints.

SUMMARY

One object of the present disclosure is to provide a method for controlling movement trajectories of a robot, which method provides an effective and/or simple control of movement trajectories.

A further object of the present disclosure is to provide a method that enables an effective and/or simple programming of movement trajectories of a robot.

A still further object of the present disclosure is to provide a method for controlling movement trajectories of a robot, which method generates a fast selection of an optimal, or near optimal, movement trajectory.

A still further object of the present disclosure is to provide a method for controlling movement trajectories of a robot, which method is less computationally heavy in order to generate a selection of an optimal, or near optimal, movement trajectory.

A still further object of the present disclosure is to provide a method for controlling movement trajectories of a robot, which method is balanced between computation time and optimal movement trajectory.

A still further object of the present disclosure is to provide a method for controlling movement trajectories of a robot, which method is easy to use, e.g. that requires less skill by a robot programmer.

A still further object of the present disclosure is to provide a method for controlling movement trajectories of a robot, which method is simple to implement.

A still further object of the present disclosure is to provide a method for controlling movement trajectories of a robot, which method solves several or all of the foregoing objects in combination.

A still further object of the present disclosure is to provide a control system for controlling movement trajectories of a robot, which control system solves one, several or all of the foregoing objects.

According to one aspect, there is provided a method for controlling movement trajectories of a robot, the method comprising predicting, in an offline mode, values of at least one parameter related to the execution of alternative movement trajectories between a first position of the robot and a second position of the robot; selecting, in the offline mode, a movement trajectory based on the predicted values of the at least one parameter; and executing the selected movement trajectory by the robot.

The method according to the present disclosure enables identification and use of an optimal, or near optimal movement trajectory. More specifically, the method provides a selection and execution of a movement trajectory or path, that is optimal or near optimal, with respect to the at least one parameter, by using two positions of the robot and offline optimization. The method, which may be regarded as an optimization planning and execution, is easy to use by a user (e.g. a robot programmer) and effectively provides one or several optimal, or near optimal movement trajectories.

Each movement trajectory among the alternative movement trajectories may be defined by at least three points in space, i.e. the first position, the second position and at least one intermediate position. In case the alternative movement trajectories are defined by one or more intermediate positions or points, the robot moves through the one or more intermediate positions of the selected movement trajectory during execution of the selected movement trajectory. An intermediate position may be constituted by an offset position or offset point according to the present disclosure.

A movement trajectory according to the present disclosure may be three-dimensional. In case the at least one parameter is constituted by time, the optimal movement trajectory may be referred to as the set of points in the Cartesian space which has the potential to be travelled in lowest time. Given a specific three-dimensional movement trajectory, there are existing methods which can find a time-optimal movement along that specific movement trajectory, for example U.S. Pat. No. 6,216,058 B1. However, the method according to the present disclosure provides for the selection of a particular movement trajectory, among several alternative movement trajectories, that is optimal with respect to the at least one parameter. Thus, the method according to the present disclosure is not bound to a specific movement trajectory.

In case the at least one parameter is constituted by the time for executing the alternative movement trajectories, the method provides a selection and execution of a time-optimal movement trajectory between the first position and the second position. Thus, based on a first position and a second position, the method optimizes the cycle time between the first position and the second position, e.g. by means of a control system. Although the present disclosure mainly exemplifies the at least one parameter as time, it is emphasized that the method may be employed by predicting values of alternative parameters, such as energy consumption and/or component lifetime of the robot.

In many applications, the movement trajectory of a robot between a first position and a second position does not need to adopt any specific shape (circular, line, etc.). By "allowing the movement trajectory to vary", i.e. by allowing a wide range of different shapes of the movement trajectory, a better (with respect to the at least one parameter) movement trajectory can be found. In some implementations of the method, a cycle time of a movement trajectory between a first position and a second position has the potential to be reduced by 20% by finding the proper shape of the movement trajectory.

The prediction of the method may be carried out by an offline programming tool of the control system, such as a teach pendant, in order to select a movement trajectory that is optimal with respect to the at least one parameter, such as a time-optimal movement trajectory. The prediction of values may comprise generating a virtual test case for each alternative movement trajectories and determining values of the at least one parameter of each test case, for example by means of simulation.

The selection may also be carried out by the offline programming tool, i.e. automatically. Alternatively, the programming tool may propose an optimal movement trajectory to the user. The user may then either accept or decline the proposed movement trajectory prior to execution of the movement trajectory.

The first position and the second position of the robot may alternatively be referred to as a first pose and a second pose of the robot, a first point and a second point of the robot, or a start position and an end position of the robot, respectively. The positions or poses of the robot may be expressed as a position of a tool center point (TCP) of the robot. When executing the selected movement trajectory, the robot may continuously follow the movement trajectory, e.g. with the TCP, without any intermediate stop and without deviation from the movement trajectory.

The method may further comprise generating the alternative movement trajectories prior to predicting the values of the alternative movement trajectories. In this way, the method does not require an initial population of pre-defined movement trajectories.

The method may further comprise receiving a user input indicating the second position of the robot. The user input may be received by a programming tool. According to one variant, the user only has to provide a user input indicating the second position of the robot. In this case, the programming tool may select an optimal movement trajectory based on the second position as the only user input.

The alternative movement trajectories may be defined by different constants of a parametric curve. The use of one type of parametric curve to define the alternative movement trajectories enables a fast prediction of the values of the at least one parameter of the alternative movement trajectories, e.g. more operations per minute can be executed by the control system. Thus, the method according to the present disclosure may be based on a parametrized search strategy in order to find an optimal movement trajectory with respect to the at least one parameter. The method may optionally comprise receiving a user input indicating the parametric curve.

The parametric curve may be a conic section. Conic sections may be constituted by a circular arc, an elliptic arc, a parabola or a hyperbola. In each case, the parametric curve may be defined by three points (i.e. constants) on the parametric curve, for example the first position, the second position and an offset point of the conic section. In case the parametric curve is defined by an offset point, the robot travels through the offset point of the selected movement trajectory when executing the selected movement trajectory. The offset point may alternatively be referred to as maximum point, curve height, intermediate point, midpoint or way point. The conic sections may be symmetric with respect to the first position and the second position. That is, the offset point may be centered between the first position and the second position.

A parametric curve according to the present disclosure may however alternatively be constituted by a straight line. The straight line may also be defined by the first position, the second position and the offset point.

Alternatively, or in addition, the alternative movement trajectories may be defined by a jointwise movement trajectory. As used herein, a jointwise movement trajectory is a movement trajectory where only one of several joints of the robot is driven (e.g. rotated or translated).

A type of the parametric curve may be determined in dependence of the first position and/or the second position of the robot. For example, one type of parametric curve may be selected when the robot is in one type of pose in the first and/or second position (e.g. when one or more joints are at relatively large angles from a calibration position) and another type of parametric curve may be selected when the robot is in another type of pose in the first and/or second position (e.g. when one or more joints are at relatively small angles from a calibration position).

According to one variant, values of less than 500, such as less than 50, such as less than 30, such as less than 20 alternative movement trajectories may be predicted.

The alternative movement trajectories may be offset less than 50%, such as less than 30% of a distance between the first position and the second position, from a straight line between the first position and the second position. In case the alternative movement trajectories are constituted by a parametric curve in the form of a conic section, the offset distance may be constituted by the distance between a straight line between the first position and the second position and the offset point of each movement trajectory.

The method may further comprise receiving a user input, indicating the at least one parameter prior to predicting values of the at least one parameter.

The at least one parameter may be a time for the robot to execute the respective alternative movement trajectories. That is, the at least one parameter may be constituted by, or comprise, time. The method thereby provides for a time-optimal trajectory between two defined positions using offline optimization.

The first position may be a current position of the robot. In this case, the user may for example enter only a second position, wait for a movement trajectory from the first position to the second position to be selected, executed and stored in a robot program. Then, the user may enter a third position, wait for a movement trajectory from the second position to the third position to be selected, executed and stored in the robot program. In this way, the user can easily create a robot program comprising a plurality of movement trajectories that each is optimal with respect to a parameter, e.g. time-optimal. The user inputs may for example be entered to a programming tool for further processing.

The prediction of values may comprise predicting values of at least one parameter related to the execution of a first group of alternative movement trajectories between the first position and the second position, the movement trajectories in the first group having a relatively large geometric variation; defining a second group of alternative movement trajectories between the first position and the second position based on the prediction of values related to the execution of the first group, the movement trajectories of the second group having a relatively small geometric variation;

and predicting values of at least one parameter related to the execution of the second group of alternative movement trajectories. The definition of the second group may be based on the movement trajectory from the first group having a most optimal value with respect to the at least one parameter (e.g. largest or smallest value). In this way, it is likely that an optimal or near optimal movement trajectory is found in a computationally efficient manner.

The prediction of values may be made based on a kinematic model of the robot and/or a dynamic model of the robot. Furthermore, constraints of the robot, such as environmental limitations, maximum joint torques, maximum joint speeds and/or maximum joint accelerations, may also be taken into account for the prediction of values of the at least one parameter. The robot constraints may be predefined or defined by the user.

The prediction of values may take a tool parameter associated with a robot tool of the robot into account. According to one variant, the method further comprises receiving a user input indicating a tool parameter related to the robot tool of the robot, e.g. type of robot tool and/or weight of the robot tool.

The prediction of values may take an external load on the robot into account. According to one variant, the method further comprises receiving a user input indicating a parameter related to an external load on the robot, e.g. a payload or an additional arm load. Alternatively, or in addition, the prediction of the values of the at least one parameter may comprise the use of neural networks. Machine learning techniques may thereby be used to predict values of the at least one parameter faster and more accurate.

According to a further aspect, there is provided a control system for controlling movement trajectories of a robot, the control system comprising a data processing device and a memory having a computer program stored thereon, the computer program comprising program code which, when executed by the data processing device, causes the data processing device to perform the steps of predicting, in an offline mode, values of at least one parameter related to the execution of alternative movement trajectories between a first position of the robot and a second position of the robot; selecting, in the offline mode, a movement trajectory based on the predicted values of the at least one parameter; and controlling the robot to execute the selected movement trajectory.

The control system may comprise a programming tool that can select a movement trajectory that is optimal with respect to the at least one parameter, such as a time-optimal movement trajectory. The programming tool may comprise an offline planner or offline search algorithm for the prediction of values and the selection of a movement trajectory according to the present disclosure. The robot program may then be uploaded, e.g. to a robot controller of the control system, and executed by the robot.

According to a further aspect, there is provided a robot comprising a control system according to the present disclosure. A robot according to the present disclosure may be of a wide range of types, for example a robot having at least three degrees of freedom, such as six or seven degrees of freedom.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
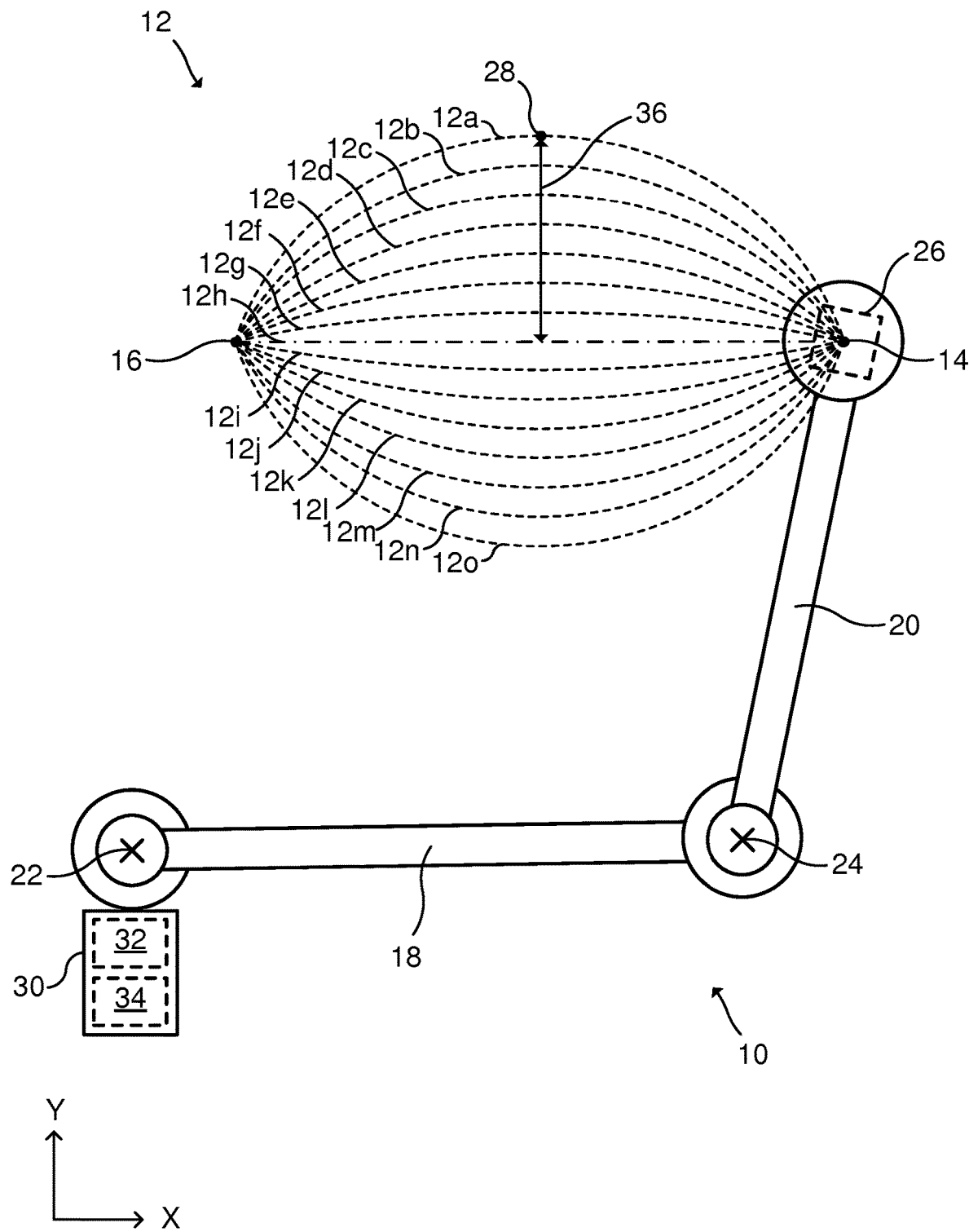
FIG. 1: schematically represents a top view of one example of a robot and alternative movement trajectories.

In the following, a method and a control system for controlling movement trajectories of a robot, where values of at least one parameter related to the execution of alternative movement trajectories are predicted, will be described. The same reference numerals will be used to denote the same or similar structural features.

FIG. 1 schematically represents a top view of one example of a robot 10 and alternative movement trajectories 12a-12o between a first position 14 and a second position 16 of the robot 10. The first position 14 is constituted by the current position or start position of the robot 10. The second position 16 is constituted by a target position or an end position of the robot 10.

One, several or all of the movement trajectories 12a-12o are also referred to with reference numeral 12. FIG. 1 further denotes the horizontal X-axis and the horizontal Y-axis of a Cartesian coordinate system for referencing purposes. The robot 10 may however be oriented arbitrarily in space.

The robot 10 may for example be constituted by an industrial robot. In FIG. 1, the robot 10 is exemplified as a SCARA robot (Selective Compliance Articulated Robot Arm). The present disclosure is however not limited to robots 10 of this type. The robot 10 in FIG. 1 comprises a first arm 18 and a second arm 20. The first arm 18 is rotatable about a first rotational axis 22 relative to a base (not shown) at a first joint. The second arm 20 is rotatable about a second rotational axis 24 relative to the first arm 18 at a second joint.

The robot 10 further comprises an end effector constituted by a robot tool 26. The robot tool 26 may be moved vertically (along the Z-axis) by means of a third joint (not shown). Thus, the robot 10 of this non-limiting example has three degrees of freedom.

In FIG. 1, each alternative movement trajectory 12 is represented by a parametric curve in the form of a circular arc. Each movement trajectory 12 can be uniquely defined by three points on the circular arc. In this example, these three points of each movement trajectory 12 are the first position 14, the second position 16 and an offset point 28 (only the offset point 28 of one of the movement trajectories 12 is illustrated).

The robot 10 further comprises a control system 30. The control system 30 comprises a data processing device 32 (e.g. a central processing unit, CPU) and a memory 34. A computer program is stored in the memory 34. The computer program comprises program code which, when executed by the data processing device 32, causes the data processing device 32 to predict, in an offline mode, values of at least one parameter related to the execution of alternative movement trajectories 12 between a first position 14 of the robot 10 and a second position 16 of the robot 10, select, in the offline mode, a movement trajectory 12 based on the predicted values of the at least one parameter, and control the robot 10 to execute the selected movement trajectory 12. The control system 30 may further be configured to execute any processing operation according to the present disclosure and to control the robot 10 to execute any movement according to the present disclosure. The control system 30 may for example comprise a robot controller and a programming tool, such as a teach pendant. In this case, the programming tool may be physically separated from the robot controller.

The programming tool may contain a dynamic model and a kinematic model of the robot 10. The user may optionally enter parameters related to the robot 10 to the programming tool. Examples of such parameters are the type of robot 10, one or more parameters related to the robot tool 26 currently used, payload on the robot tool 26, and arm loads.

Figure 2:
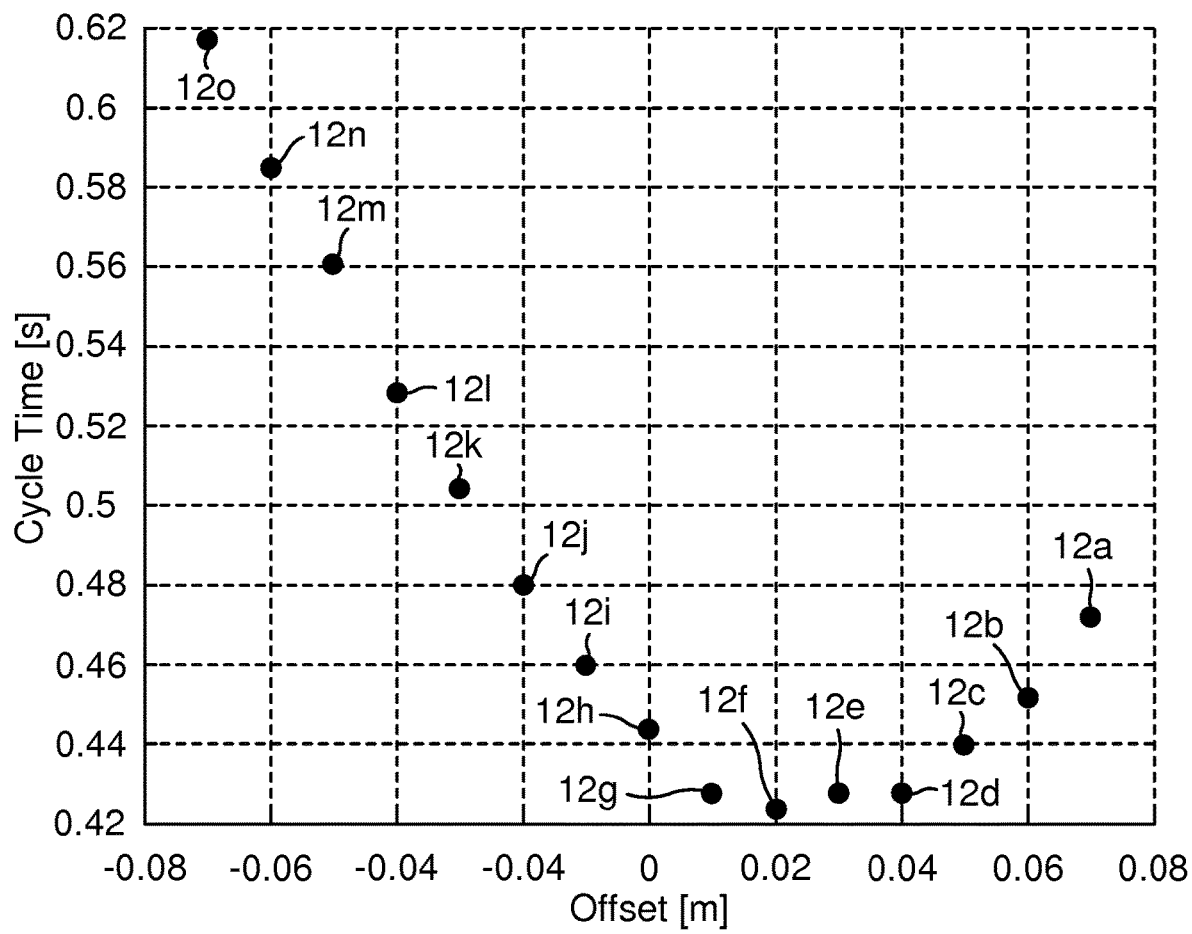
FIG. 2: shows a diagram indicating the cycle time and offset distance for each alternative movement trajectory in FIG. 1.

FIG. 2 shows a diagram indicating the cycle time and offset distance 36 for each alternative movement trajectory 12 in FIG. 1. The offset points 28 of the movement trajectories 12 are incrementally varied with 10 mm. Again, it is emphasized that the at least one parameter of the method may be constituted by or comprise at least one parameter other than time. The present disclosure can also be applied for alternative parameters, for example energy consumption and component lifetime.

As can be seen in FIG. 2, the movement trajectory 12*h*, which is constituted by a straight line between the first position 14 and the second position 16, is not the fastest movement trajectory 12. Instead, the movement trajectory 12*f*, which in this non-limiting example is offset 0.02 m from the straight movement trajectory 12*h*, is the fastest, and hence time-optimal.

With reference to FIGS. 1 to 5, one example of a method for controlling movement trajectories 12 of the robot 10 will be described. The type of parameter to be optimized may optionally be input by the user or may alternatively be predefined. In this example, the method aims to find and execute a time-optimal movement trajectory 12.

The user may input a desired second position 16 of the robot 10 to the programming tool. Unless specified, the first position 14 may be assumed to be the current position of the robot 10. Given the first position 14, the second position 16, and optional further conditions (e.g. type of robot 10, type of robot tool 26, etc.), the programming tool may choose the most suitable parametric curve and ranges of variation. For example, the programming tool may select one type of parametric curve when the robot 10 is in one type of position (e.g. when one or more joints are at relatively large angles from a calibration position) and select another type of parametric curve when the robot 10 is in another type of position (e.g. when one or more joints are at relatively small angles from a calibration position). Thus, the parametric curve is determined in dependence of the first position 14 and/or the second position 16. In this case, a parametric curve in the form of a circular arc is chosen, in accordance with FIG. 1.

Each parametric curve is constituted by a circular arc defined by the first position 14, the second position 16 and an offset point 28. Since the first position 14 and the second position 16 are the same for all alternative movement trajectories 12, each parametric curve may be uniquely defined by its offset point 28. The problem may therefore in this specific case be reformulated as optimizing the position of the offset point 28 of the parametric curve.

The programming tool may further define a range of variation by setting an "outermost" movement trajectory 12 or by defining a maximum offset distance 36 for the outermost movement trajectories 12*a*, 12*o*. The maximum offset distance 36 may for example be set to less than 50% of the distance between the first position 14 and the second position 16.

Figure 3:
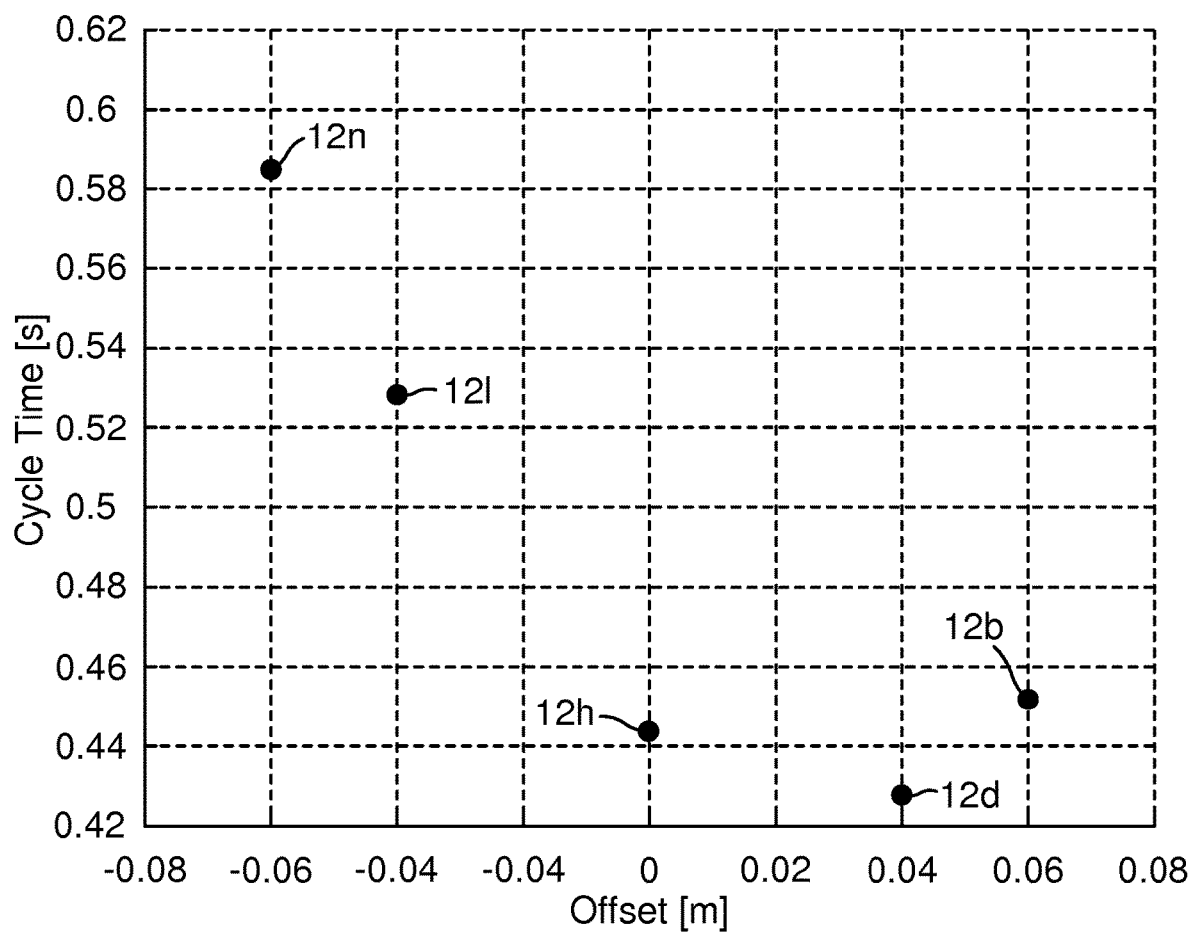
FIG. 3: shows a diagram indicating the cycle time and offset distance for a first group of alternative movement trajectories among the alternative movement trajectories in FIG. 2.

The programming tool may then set a number of alternative movement trajectories 12 in a first group for prediction. The alternative movement trajectories 12 may be equally distributed, or substantially equally distributed, within the range of variation. The programming tool may then generate a set of alternative movement trajectories 12. In this example, the number for the first group is set to five. In the first group of alternative movement trajectories 12, the movement trajectories 12 may have a relatively large geometric variation. As can be seen in FIG. 3, movement trajectories 12*b*, 12*d*, 12*h*, 12*l*, 12*n* are generated. The movement trajectories 12*b*, 12*d*, 12*h*, 12*l*, 12*n* have relatively largely varying offset points 28.

The programming tool then predicts the cycle times for each movement trajectory 12 in the first group in an offline mode. The movement trajectories 12 for prediction may be referred to as test cases. The prediction of cycle times may be made with a simulation (e.g. in RobotStudio®) based on a kinematic model and a dynamic model of the robot 10. The simulation may optionally take a tool parameter associated with the robot tool 26 into account, such as its weight. The diagram in FIG. 3 shows the predicted cycle time and offset distance 36 for the first group of alternative movement trajectories 12. Thus, in this example, the parameter is constituted by time and the values are the predicted cycle time of each movement trajectory 12.

Figure 4:
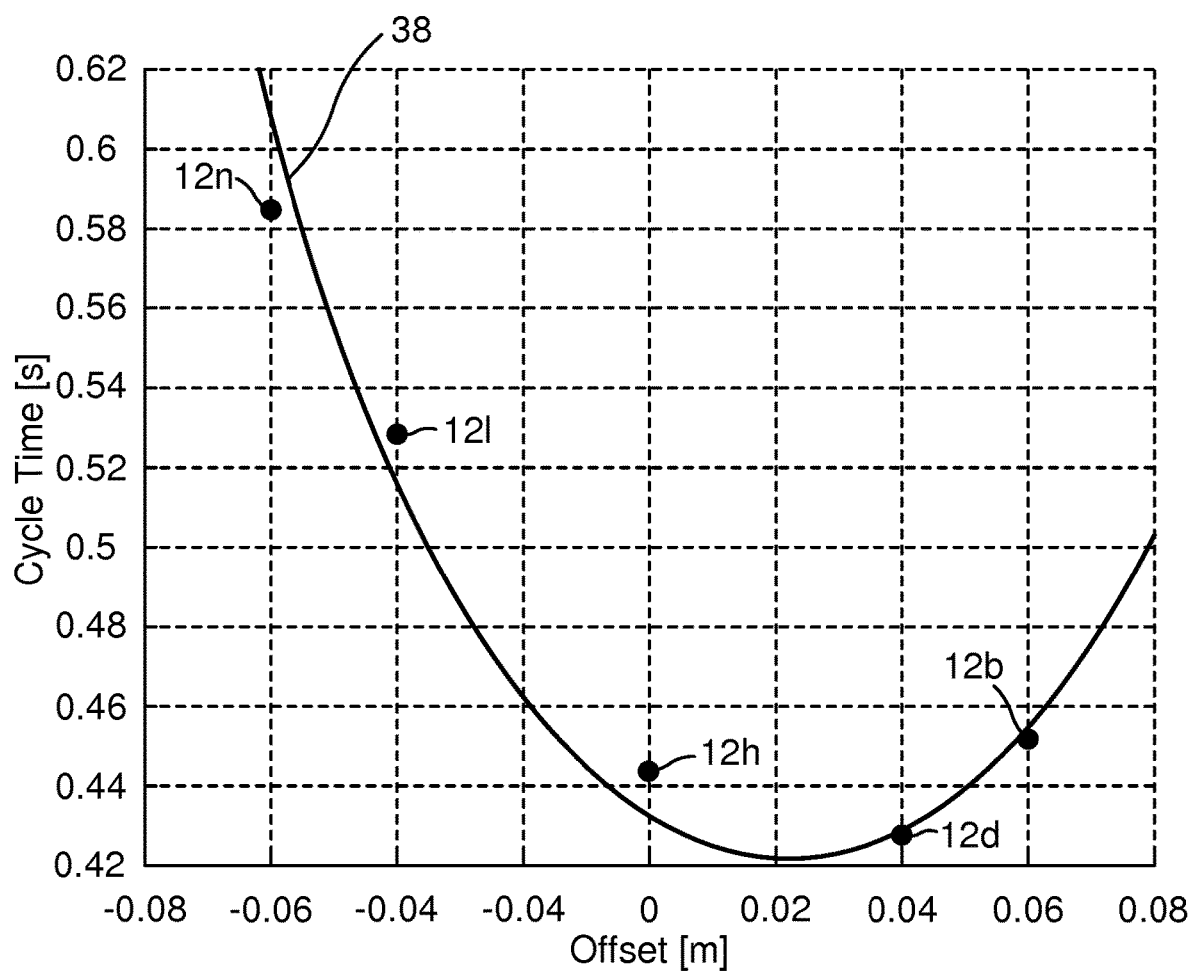
FIG. 4: shows the diagram in FIG. 3 and an approximation of the first group of alternative movement trajectories.

FIG. 4 shows the diagram in FIG. 3 and an approximation of the first group of alternative movement trajectories 12. In FIG. 4, the five movement trajectories 12*b*, 12*d*, 12*h*, 12*l*, 12*n* are approximated by a parabolic curve 38.

Alternative types of curves may however be used to approximate a plurality of movement trajectories 12.

Figure 5:
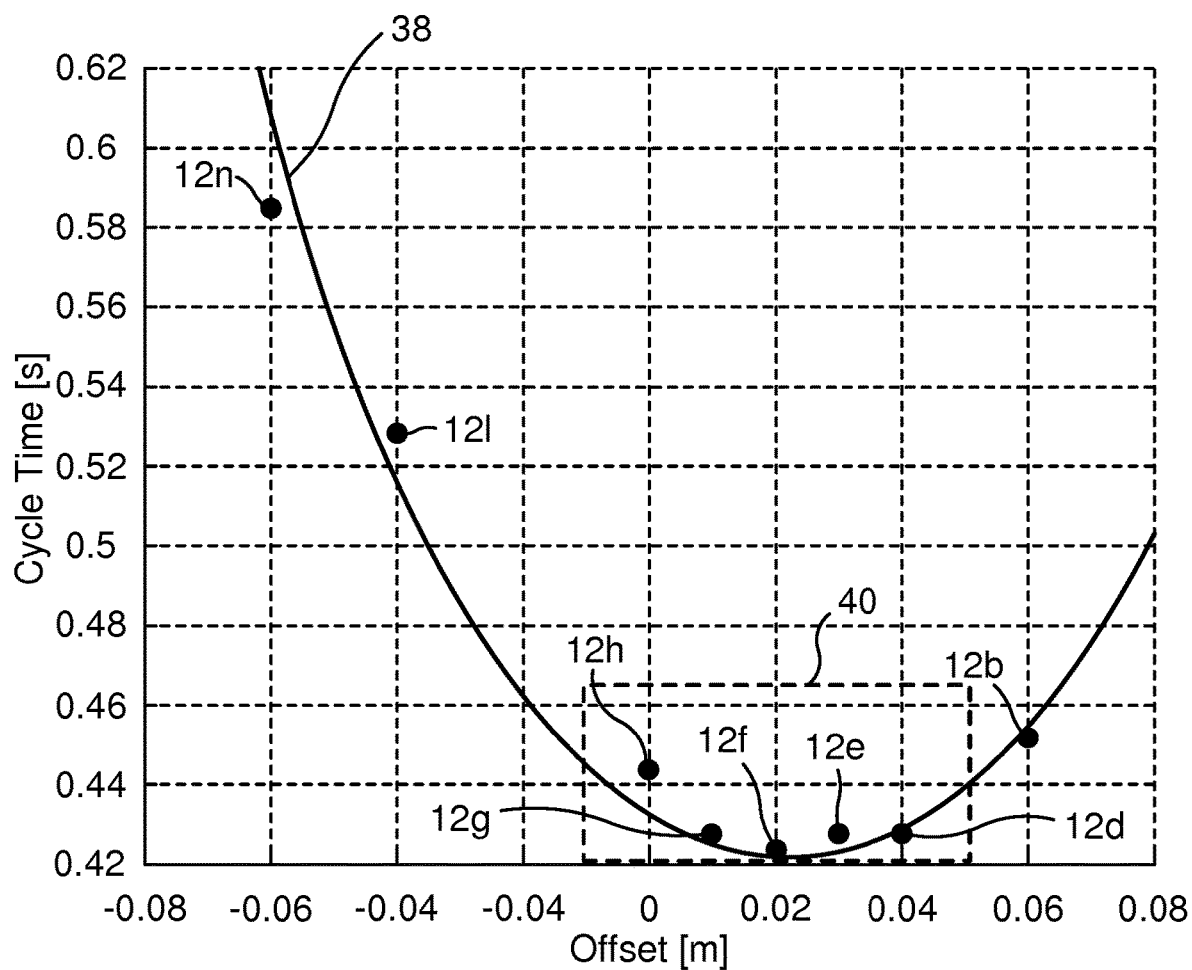
FIG. 5: shows the diagram in FIG. 4, an application of a region of interest and a second group of alternative movement trajectories.

FIG. 5 shows the diagram in FIG. 4, an application of a region of interest 40 and a second group of alternative movement trajectories 12. The region of interest 40 is applied over the minimum of the parabolic curve 38. The region of interest 40 indicates a selection of movement trajectories 12 that are estimated to have the most potential to be time-optimal. Thus, a time-optimal movement trajectory 12 is expected to be positioned close to the minimum of the parabolic curve 38. The second group comprises movement trajectories 12 within the region of interest 40 having a relatively small geometric variation. In this example, the second group also comprises the movement trajectory 12*d* from the first group that has the most optimal value among the first group.

The time of each of the three further movement trajectories 12*e*, 12*f*, 12*g* is then predicted. Among the alternative movement trajectories 12 for which the time has been predicted, in this case the movement trajectories 12*b*, 12*d*, 12*e*, 12*f*, 12*g*, 12*h*, 12*i*, 12*n*, the programming tool selects the movement trajectory 12*f*, which has the shortest cycle time. This is a computationally effective way to find a time-optimal movement trajectory 12. Thus, instead of predicting the time for each of the 15 movement trajectories 12 in FIG. 2, the time for only eight movement trajectories 12 are predicted in this example while still finding the time-optimal movement trajectory 12*f*.

A time-optimal movement trajectory 12 from the first position 14 to the second position 16 using offline optimization is thereby generated. The programming tool may propose this fastest movement trajectory 12 to the user for offline selection.

The user may thereby only enter the second position 16 and push a button (e.g. on the programming tool) to get the fastest (or the near fastest) movement trajectory 12 from the first position 14 to the second position 16. The generation of the fastest (or the near fastest) movement trajectory 12 is fast since cycle times of relatively few alternative movement trajectories 12 are predicted. The prediction is particularly fast when predicting cycle times of a first group and a second group of alternative movement trajectories 12 as described above.

The user may then store the movement trajectory 12. The movement trajectory 12 may then be executed by the robot 10, optionally after programming additional movement trajectories 12. For example, when the robot 10 is positioned at the second position 16, the method may be executed again for a second movement trajectory from the second position 16 to a third position.

While the present disclosure has been described with reference to exemplary embodiments, it will be appreciated that the present invention is not limited to what has been described above.

The invention claimed is:

1. A method for controlling movement trajectories of a robot,
the method comprising:
predicting, in an offline mode, values of at least one parameter related to the execution of alternative movement trajectories between a first position of the robot and a second position of the robot;
selecting, in the offline mode, a movement trajectory based on the predicted values of the at least one parameter; and
executing the selected movement trajectory by the robot;
wherein the method further comprises:
generating the alternative movement trajectories prior to predicting the values of the at least one parameter related to the execution of the alternative movement trajectories;
wherein the alternative movement trajectories are defined by different constants of a parametric curve; and
wherein the alternative movement trajectories are offset less than 50% of a distance between the first position and the second positon, from a straight line between the first position and the second position.

2. The method according to claim 1, further comprising receiving a user input indicating the second position of the robot.

3. The method according to claim 1, wherein the parametric curve is a conic section.

4. The method according to claim 1, wherein a type of the parametric curve is determined in dependence of the first position and/or the second position.

5. The method according to claim 1, wherein values of the at least one parameter of less than 500 alternative movement trajectories are predicted.

6. The method according to claim 1, further comprising receiving a user input indicating the at least one parameter, prior to predicting values of the at least one parameter.

7. The method according to claim 1, wherein the at least one parameter is a time for the robot to execute the respective alternative movement trajectories.

8. The method according to claim 1, wherein the first position is a current position of the robot.

9. The method according to claim 1, wherein the prediction of values includes:
predicting values of at least one parameter related to the execution of a first group of alternative movement trajectories between the first position and the second position, the movement trajectories in the first group having a first geometric variation;
defining a second group of alternative movement trajectories between the first position and the second position based on the prediction of values related to the execution of the first group, the movement trajectories of the second group having a second geometric variation which is smaller than the first geometric variation; and
predicting values of at least one parameter related to the execution of the second group.

10. The method according to claim 1, wherein the prediction of values is made based on a kinematic model of the robot and/or a dynamic model of the robot.

11. The method according to claim 1, wherein the prediction of values takes a tool parameter associated with a robot tool of the robot into account.

12. The method according to claim 1, wherein the first position and the second position are consecutive.

13. A control system for controlling movement trajectories of a robot, the control system comprising a data processing device and a memory having a computer program stored thereon, the computer program including program code which, when executed by the data processing device, causes the data processing device to perform the steps of:
predicting, in an offline mode, values of at least one parameter related to the execution of alternative movement trajectories between a first position of the robot and a second position of the robot;
selecting, in the offline mode, a movement trajectory based on the predicted values of the at least one parameter;
controlling the robot to execute the selected movement trajectory; and
generating the alternative movement trajectories prior to predicting the values of the at least one parameter related to the execution of the alternative movement trajectories;
wherein the alternative movement trajectories are defined by different constants of a parametric curve;
wherein the alternative movement trajectories are offset less than 50% of a distance between the first position and the second positon, from a straight line between the first position and the second position.

14. The control system according to claim 13, wherein the first position and the second position are consecutive.

* * * * *